United States Patent [19]

Schurr

[11] 4,101,865

[45] Jul. 18, 1978

[54] SONIC ECHO-SOUNDER FOR THE MEASUREMENT OF LEVELS OF SUBSTANCES

[75] Inventor: Peter Schurr, Maulburg, Fed. Rep. of Germany

[73] Assignee: Endress & Hauser GmbH & Co., Maulburg, Fed. Rep. of Germany

[21] Appl. No.: 729,638

[22] Filed: Oct. 5, 1976

[30] Foreign Application Priority Data

Oct. 24, 1975 [DE] Fed. Rep. of Germany ....... 2547759

[51] Int. Cl.² .......................... G01S 9/68; G01F 23/28
[52] U.S. Cl. .................................. 340/1 L; 73/290 V; 181/400; 310/334; 340/8 MM
[58] Field of Search .......................... 340/1 L, 8 MM; 73/290 V; 181/400, 401, 402; 310/8.3

[56] References Cited

U.S. PATENT DOCUMENTS

| 3,252,335 | 5/1966 | Eisner | 181/400 X |
| 3,295,629 | 1/1967 | Papadakis | 181/400 X |
| 3,834,233 | 9/1974 | Willis et al. | 73/290 V |

Primary Examiner—Richard A. Farley
Attorney, Agent, or Firm—Pollock, Vande Sande & Priddy

[57] ABSTRACT

An acoustic echo-sounder arranged to determine the level of a substance in a container. The echo-sounder includes an acoustic transducer fitted to one end of an acoustic wave-guide, the acoustic impedance of which is progressively matched to the acoustic impedance of the space containing the substance in order to avoid disturbing reflections. In a preferred embodiment, the end portion of the acoustic wave-guide is constructed so that its solid cross-section diminishes progressively towards the end of the wave-guide.

9 Claims, 7 Drawing Figures

U.S. Patent July 18, 1978 4,101,865
Fig.1
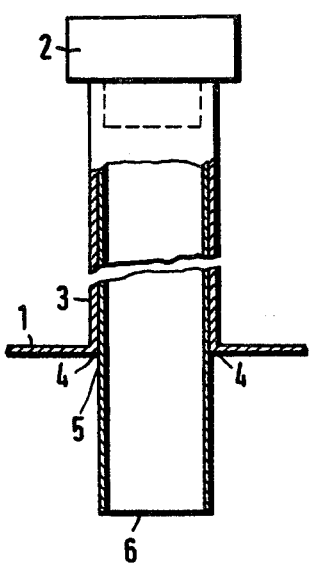
Fig.2
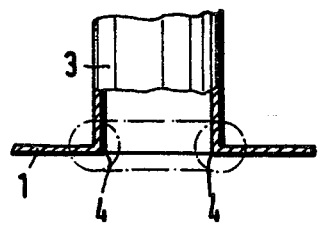
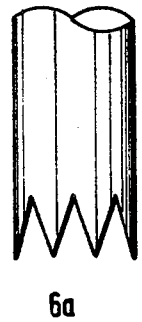 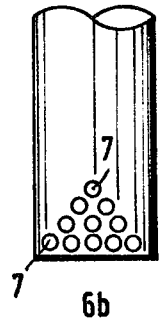 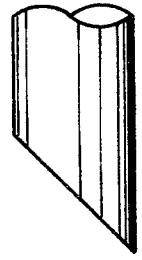  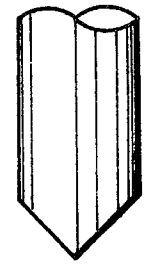
Fig.3a   Fig.3b   Fig.3c   Fig.3d   Fig.3e
6a   6b   6c   6d   6e

SONIC ECHO-SOUNDER FOR THE MEASUREMENT OF LEVELS OF SUBSTANCES

The invention relates to a sonic echo-sounder for the measurement of levels of substances in closed or open containers, channels or the like, including a sonic transducer placed at one end of an acoustic waveguide, the other end of which is directed towards the substance of which the level is to be determined.

In the measurement of levels of substances with an acoustic echo-sounder it is necessary that a minimum distance be maintained between the acoustic transducer and the surface of the substance the level of which is to be measured. The magnitude of this distance is determined chiefly by the decay time of the transducer. On the other hand there is the requirement, in the measurement of levels of substances, that the measurement also be possible when the closed or open container or channel is filled to its brim. The measurement of such a high level of the substance thus requires that the acoustic transducer be placed a certain distance above the anticipated maximum level of the substance, so that its decay time can be compensated. For this reason the acoustic transducer is usually mounted at the upper end of an extension tube, the lower end of which is connected with the margin of an opening in the container wall for a closed container, or the upper edge of the wall of the container or channel, in the case of an open container or channel. In such cases the extension tube acts as an acoustic wave-guide. In determining levels of substances by acoustic echo-sounding it may also be suitable or necessary for other reasons to guide or deflect the sound by means of a tube. This can occur if the sound propagation is disturbed by wind or apparatus components, or if lack of space necessitates a horizontally displaced mounting of the acoustic transducer.

All these types of application suffer from the common disadvantage that when the transmitted acoustic pulses occur, disturbing reflections are generated at the end of the acoustic wave-guide i.e., at right angles to the direction of sound propagation, leading to erroneous indications.. In known manner it has been attempted to reduce the effect of this disturbing reflection on the useful signal by arranging that the diameter of the extension tube or acoustic wave-guide corresponds with the diameter of the acoustic beam which can result in very large tube diameters, or by making the end of the tube funnel-shaped. This solution, however, is very expensive and imperfect and has the disadvantage that the choice of tube diameter is subject to restrictions.

The invention relates to the problem of providing an acoustic echo-sounder of the kind initially stated, in which disturbing reflections do not occur at the exit end of the acoustic guide tube.

According to the present invention there is provided an acoustic echo-sounder arranged to determine the level of a substance in a closed or open container or channel, including an acoustic transducer that is fitted to one end of an acoustic wave-guide, the other end of which is directed towards the substance of which the level is to be determined, wherein the acoustic impedance of the acoustic wave-guide is progressively matched to the acoustic impedance of the space containing the substance.

In an acoustic echo-sounder in accordance with the invention, the formation of disturbing reflections is substantially prevented by the smooth transition between the different pressures or acoustic impedances of the acoustic wave-guide and the adjacent space, e.g. the interior of the container (or even the atmospheric pressure). The useful signal is correspondingly enhanced and the advantage is obtained that a normal commercially available tube, not limited to a certain minimum diameter may be used for the manufacture of the acoustic wave-guide.

In the before-mentioned case of measuring levels in closed containers, in which the acoustic transducer is fastened to the upper end of an extension tube the other end is fastened to the margin of an opening in the container wall, it is generally impossible to construct the extension tube itself in the stated manner. In accordance with a preferred embodiment of the invention this problem is overcome by making the acoustic wave-guide an adaptor tube, introduced into the extension tube, of which the end opposite to the acoustic transducer extends through the extension tube into the interior of the container.

In other cases, in which the end of the extension tube remote from the acoustic transducer is free, this tube itself may be constructed in the stated manner as the acoustic wave-guide, so that only one tube is necessary.

In all cases a preferred embodiment of the invention consists in that the end of the acoustic wave-guide directed towards the substance to be measured is so constructed that its solid cross-section gradually diminishes towards the end. This gives the desired impedance matching, if the length of the region of gradual reduction of the cross-section is greater than the acoustic wavelength.

The term "solid cross-section" is intended to refer that part of the tube wall cross-section that consists of the tube material, disregarding any openings or piercings.

There are various possible ways of constructing such gradually diminishing solid cross-sections of a tube.

A first embodiment of the invention consists in that the end section of the acoustic wave-guide is notched in the manner of a crown.

In another embodiment of the invention the end section of the acoustic guide tube is provided with several circumferentially extending rows of radial bores, and the number of bores in each row is smaller the further the row is from the end of the acoustic guide tube.

Finally, it is also possible to cut off the end section of the acoustic guide tube obliquely. The cut may be located in a single section plane or alternatively in two section planes inclined to a diametral plane.

Embodiments of the invention are shown in the drawings, in which:

FIG. 1 shows a schematic, partly sectional, view of the upper part of a container and the acoustic echo-sounder fitted therein;

FIG. 2 shows a schematic diagram explanatory of the origin of disturbing reflections in a known acoustic echo-sounder; and FIGS. 3a–3e show different constructions of the lower section of the adaptor tube provided in the embodiment of FIG. 1.

FIG. 1 shows a part of the wall 1 of a container, in which the level of a substance is to be determined with the aid of an acoustic echo-sounder. The acoustic echo-sounder consists of an acoustic transducer 2 that is mounted at the upper end of an extension tube 3, of which the end nearer the substance of which the level is to be determined is connected to the margin of an opening in the container wall. The extension tube has the purpose of maintaining a predetermined minimum distance between the acoustic transducer 2 and the upper surface of the substance at its highest expected level.

If, as is the case with known acoustic echo-sounders of this kind, only the extension tube 3 is present (which then also serves as acoustic wave-guide), then, in response to the transition of transmitted acoustic impulses from the extension tube 3 into the container, disturbing reflections are caused at the connection point 4 between the extension tube 3 and the container wall 1, producing false readings.

In FIG. 2 the location at which these disturbing impulses appear is represented by an annular region indicated in broken line.

In the acoustic echo-sounder represented in FIG. 1 the generation of these interfering reflections is prevented because there is introduced into the interior of the extension tube 3 an adaptor tube 5 that assumes the function of acoustic wave-guide. The upper end of the adaptor tube 5 is connected to the acoustic transducer, while the lower section 6 extends a certain amount into the interior of the container. This section 6 is so constructed, for example in one of the ways shown in FIG. 3, that its solid cross-section gradually diminishes towards the lower end of the adaptor tube. In this manner a progressive matching of the acoustic impedance of the acoustic wave-guide to that of the container is attained so that the generation of disturbing reflections is avoided. The length of the region of gradual reduction of solid cross-section is greater than the acoustic wavelength.

FIGS. 3a–3e shows different alternative forms of the end portion of the adaptor tube 5 of FIG. 1, by which a progressive reduction of solid cross-section is obtained.

The tube end portion 6a shown in FIG. 3a is notched in the manner of a crown. If a transverse section through the tube is taken within this notched region, only a part of the orginal annular cross-section of the tube consists of the tube material, the remaining part consists of air. The sum of the parts of the cross-section consisting of tube material is herein designated the "solid cross-section". It will be perceived that in the construction of FIG. 3a the ratio of the solid cross-section to the total cross-section of the tube becomes smaller the closer is the section plane to the lower end of the adaptor tube. In this embodiment the solid cross-section diminishes continuously from the full tube wall cross-section to nil.

The tube end portion 6b shown in FIG. 3b is provided with several rows of radial throughholes 7 around its circumference. In the lowest row there are a large number of closely adjacent holes. In the row above, the number of holes 7 is smaller and in the succeeking rows the number of holes per row diminishes with increasing distance from the lower end. If cross-sections are taken through the rows of holes, the solid cross-section is obviously smaller the nearer is the row of holes to the lower end of the adaptor tube. While in this embodiment the change in cross-section is stepwise rather than this in general is sufficient to produce adequeately progressive impedance matching.

In the embodiment of FIG. 3c the tube end portion 6c is simply cut obliquely, and again a continuous reduction of the solid cross-section from the full tube wall cross-section to zero cross-section is obtained.

In the embodiments of FIGS. 3d and 3e, the tube end portion 6d and 6e respectively is cut obliquely in two section planes inclined to a diametral plane; the section planes in FIG. 3d diverge towards the end of the adaptor tube, while in FIG. 3e they converge towards the end of the tube. In both cases a solid cross-section is again obtained that diminishes continuously from the full tube-wall cross-section to zero.

In the above-described embodiments it is assumed that the acoustic echo-sounder for determining the level of the substance is to be employed in a container enclosed on all sides and is therefore secured to the upper container wall by means of an extension tube. The invention is not limited to this application, however, but may find application whenever the acoustic transducer is fastened to one end of an acoustic wave-guide, the other end of which is directed towards the substance the level of which is to be determined. For example, the acoustic wave-guide may be secured in any convenient manner to an open container or to a channel. Even in these cases the generation of disturbing reflections, is a problem and may be overcome by constructing the free end of the acoustic wave-guide in accordance with the invention, e.g. in accordance with one of the embodiments shown in FIG. 3. In many cases the use of a special adaptor tube, introduced into an extension tube, is unnecessary and a single acoustic wave-guide, the free end of which is constructed in the stated manner will be sufficient.

It will be understood that in use the described apparatus is complemented by known circuitry, whereby the transducer emits acoustic pulses in response to applied electrical signals and whereby echo pulses returning to the transducer are processed to determine the distance of the surface of the substance, the level of which be determined, from the transducer.

What we claim is:

1. An acoustic echo-sounder for determining the level of a substance in a container or channel, comprising
    (a) an acoustic transducer;
    (b) an acoustic wave-guided tube having said transducer fitted to one of its ends, the other of its ends being oriented towards the substance the level of which is to be determined;
    (c) said other end of said acoustic wave-guided tube being so constructed so that its solid cross-section diminishes progressively towards said other end of the wave-guide tube, whereby the acoustic impedance of the acoustic wave-guide tube is progressively matched to the acoustic impedance of the space containing the substance.

2. An acoustic echo-sounder in accordance with claim 1, wherein the length of said other end is greater than the acoustic wavelenght.

3. An acoustic echo-sounder in accordance with claim 1 wherein said other end of the acoustic wave-guide tube is notched in the manner of a crown.

4. An acoustic echo-sounder in accordance with claim 1 wherein said other end of the acoustic wave-guide tube is provided with a plurality of circumferential rows of radial bores, the number of bores in each row being less the further the row is from said other end of the acoustic wave-guide tube.

5. An acoustic echo-sounder in accordance with claim 1 wherein said other end of the acoustic wave-guide tube is cut obliquely.

6. An acoustic echo-sounder in accordance with claim 1, wherein said other end of the acoustic wave-guide tube is cut obliquely in two section planes inclined to a diametral plane.

7. An acoustic echo-sounder in accordance with claim 6, wherein the section planes diverge towards said other end of the acoustic wave-guide tube.

8. An acoustic echo-sounder in accordance with claim 6, wherein the section planes converge towards said other end of the acoustic wave-guide tube.

9. An acoustic echo-sounder for determining the level of a substance in a closed container, comprising
   (a) an acoustic transducer;
   (b) an extension tube having said transducer secured to its upper end, the other of its ends being connected to the margin of an aperture in a wall of said container; and
   (c) an adaptor tube fitted into said extension tube, the end of the adaptor tube remote from the acoustic transducer extending beyond the extension tube into the interior of the container, the end portion of said adaptor tube directed towards the substance the level of which is to be determined being so constructed that its solid cross-section diminishes progressively towards said end of the adaptor tube, whereby the acoustic impedance of the adaptor tube is progressively matched to the acoustic impedance of the space containing the substance.

* * * * *